(12) United States Patent
Szepesi

(10) Patent No.: US 9,077,198 B2
(45) Date of Patent: Jul. 7, 2015

(54) BATTERY CHARGING METHOD AND CIRCUIT

(71) Applicant: Thomas Szepesi, Saratoga, CA (US)

(72) Inventor: Thomas Szepesi, Saratoga, CA (US)

( * ) Notice: Subject to any disclaimer, the term of this patent is extended or adjusted under 35 U.S.C. 154(b) by 220 days.

(21) Appl. No.: 13/730,865

(22) Filed: Dec. 29, 2012

(65) Prior Publication Data

US 2014/0184173 A1    Jul. 3, 2014

Related U.S. Application Data

(60) Provisional application No. 61/581,638, filed on Dec. 30, 2011.

(51) Int. Cl.
  *H02J 7/06* (2006.01)
  *H02J 7/24* (2006.01)
  *H02J 7/00* (2006.01)

(52) U.S. Cl.
  CPC .............. *H02J 7/0068* (2013.01); *H02J 7/0081* (2013.01); *H02J 7/0093* (2013.01)

(58) Field of Classification Search
  CPC ....... B60L 11/185; H02J 7/045; H02J 7/0052; H02J 7/0068; H02J 7/0081; H02J 7/0093; H02H 7/047; Y02T 10/7005; Y02T 10/705; Y02T 10/7241; Y02T 90/128; Y02T 90/14
  USPC ........................... 320/145, 149, 152, 162, 164
  See application file for complete search history.

(56) References Cited

U.S. PATENT DOCUMENTS

| | | |
|---|---|---|
| 5,723,970 A | 3/1998 | Bell |
| 6,329,796 B1 | 12/2001 | Popescu |
| 6,850,039 B2 | 2/2005 | Popescu |
| 6,977,482 B2 | 12/2005 | Popescu-Stanesti |
| 7,489,109 B1 | 2/2009 | Qian |
| 7,710,079 B2 | 5/2010 | Martin |
| 7,880,443 B2 | 2/2011 | Solie |
| 2010/0156355 A1* | 6/2010 | Bauerle et al. ................ 320/145 |

* cited by examiner

*Primary Examiner* — Vuthe Siek

(57) ABSTRACT

A method and apparatus for controlling a composite battery charger including a switching regulator and a linear charger charging a battery connected to it, whereby the switching regulator provides the supply voltage for the linear charger and Device Circuits. The control method and circuit fully turns on the pass device of the linear charger in a constant current operating mode and the switching regulator is controlled to maintain a constant charge current through the pass device while also supplying device current to the Device Circuits. The device current may vary. The method and circuit limits the dissipation of the pass device of the linear charger by reducing the supply voltage as a function of the charge current in the CC/CV transition region of the battery charger and by reducing the charge current as a function of the battery voltage if the battery voltage is below a predetermined value related to a predetermined minimum supply voltage value.

14 Claims, 11 Drawing Sheets

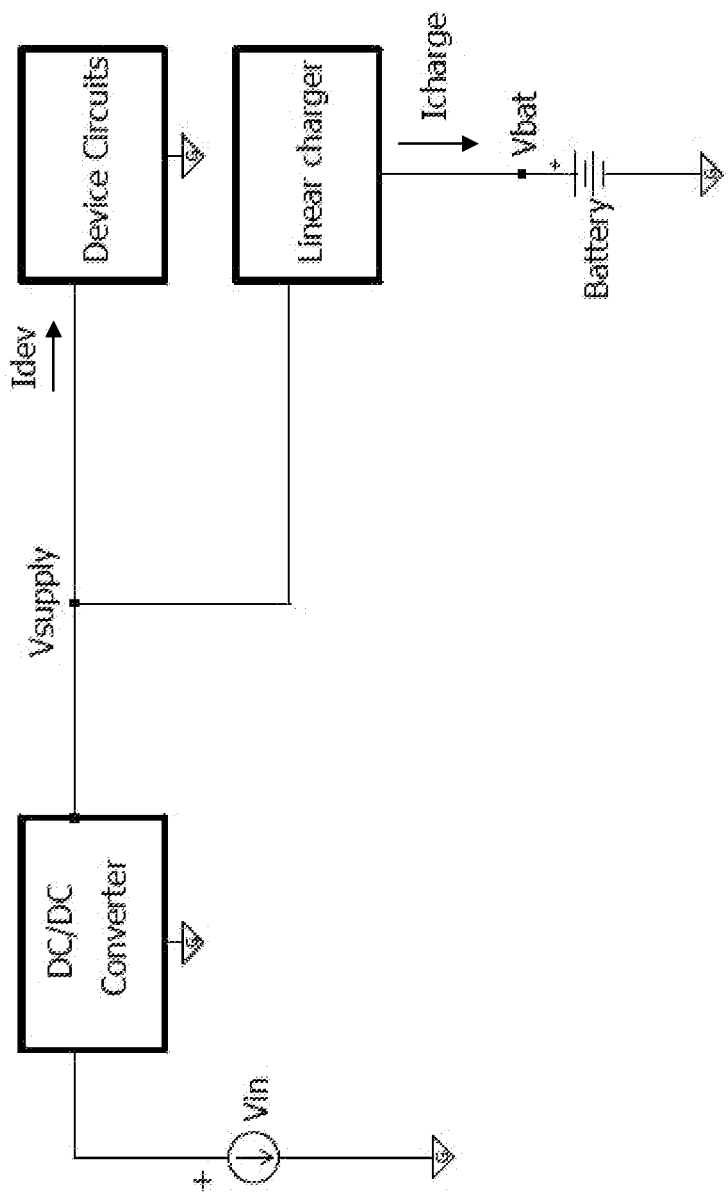
Fig. 1.a  Prior Art

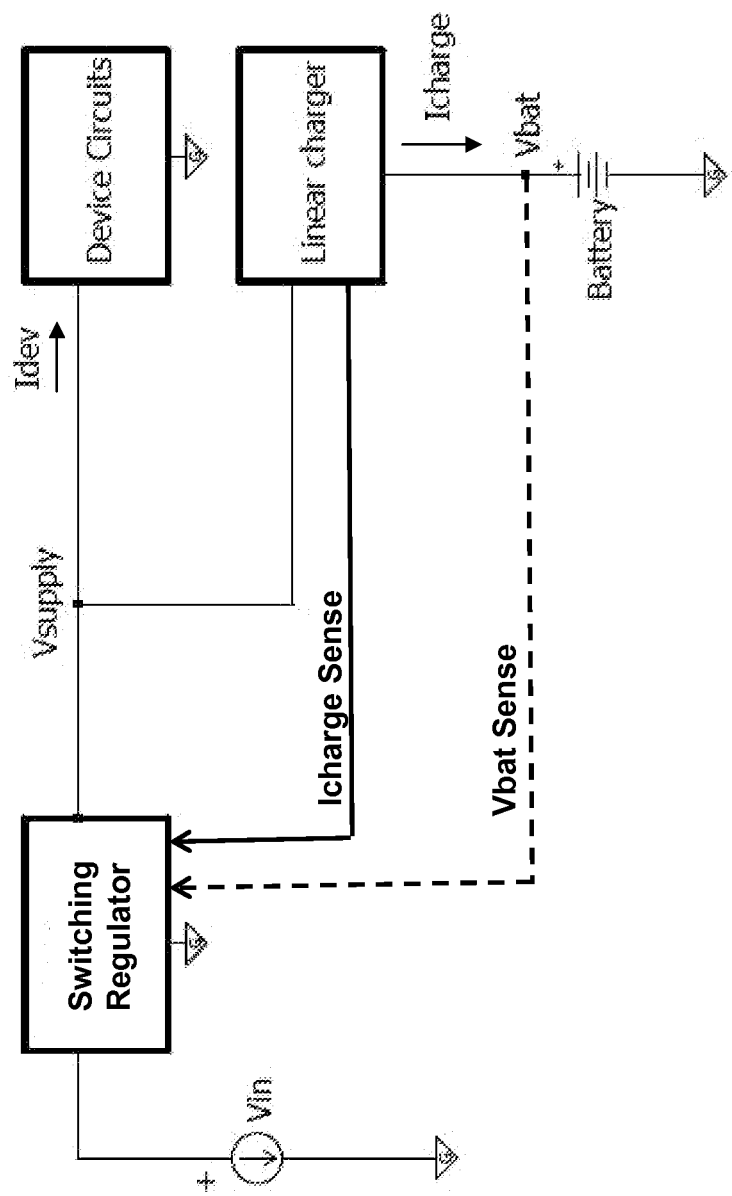
Fig. 1.b

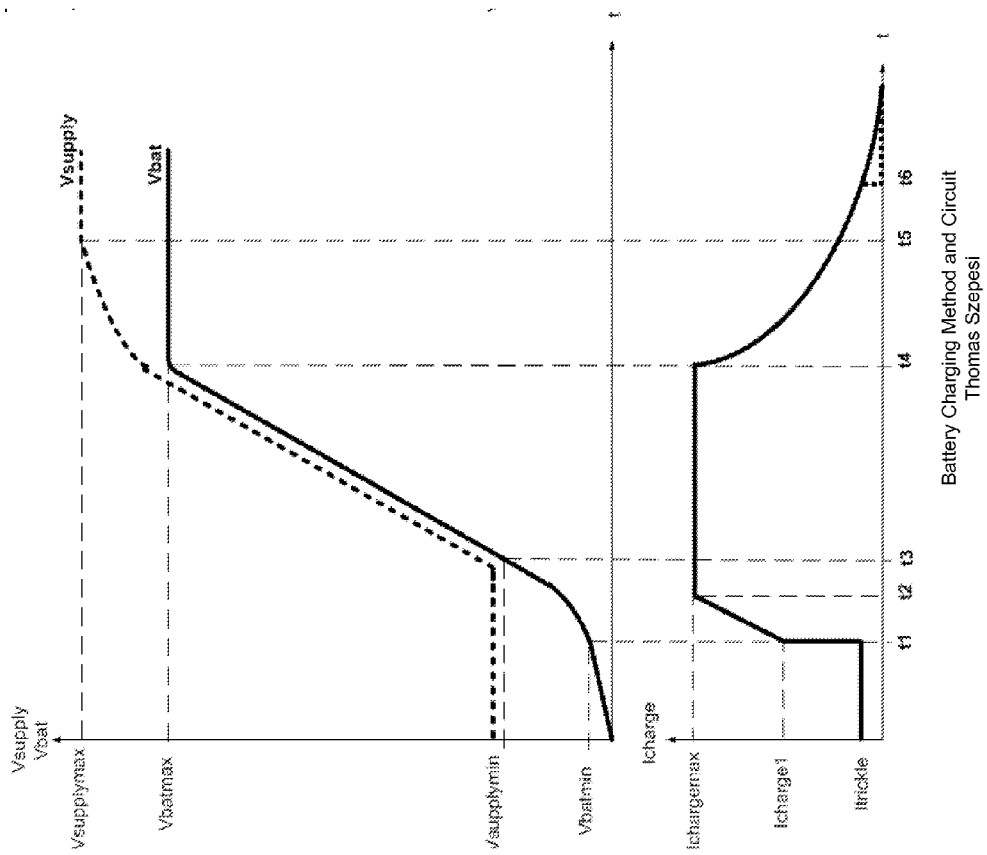

BATTERY CHARGING METHOD AND CIRCUIT

The present application claims priority to U.S. Provisional Patent Application Ser. No. 61/581,638, filed on Dec. 30, 2011, titled "Battery Charging Method and Circuit." That application is incorporated herein by reference.

BACKGROUND

In battery operated (e.g. portable) devices the battery inside the device may be charged, while the device is operated, from a source (also called power source) that is power and/or current limited. The limited power from the source may be used to both operate the device and charge the battery. An example of a current and power limited source like this is a USB port providing power, another example is an AC/DC wall adapter. In this type of application it is often required that the consumer device remain operational when connected to the power source, even if the battery is removed or if it is faulty, e.g. it is shorted. Hence, an isolation of the battery from the device's circuitry (Device Circuits hereinafter) during battery charging may be desirable. This may be achieved by separating the battery from the Device Circuits when the battery is being charged from the typically external power source.

If the power source provides a substantially constant regulated voltage (as is the case in an USB power source or some AC/DC converter wall adapters for example) then the power conversion between the source voltage and the circuitry of the device is typically accomplished using high efficiency switching voltage regulators (also called switching regulators). Switching regulators may include DC/DC converters, AC/DC converters, inductor based regulators and switched capacitor based regulators. In older devices, with lower power requirements, linear voltage regulators (or linear regulators) were sometimes used. Similarly, the battery charger function may be accomplished by a separate DC/DC converter between the power source and the battery, typically controlled by a constant-current/constant-voltage (CC/CV hereinafter) dual loop controller, as it is well known in the art.

Low cost and small size may be of high importance in portable consumer devices, and a DC/DC converter is typically more expensive and requires more physical space than a linear regulator. Thus, prior art solutions envisioned cascaded DC/DC converter and linear regulator-based battery charger (linear charger hereinafter) solutions (as well as cascaded AC/DC converter and linear charger solutions) to both power the Device Circuits and charge the battery from the same power source with limited power.

A block diagram of a prior art cascaded DC/DC converter-linear charger solution is shown in FIG. 1.a. The DC/DC converter provides the supply voltage (Vsupply) for the Device Circuits and the input voltage for the linear charger. The linear charger (with its typical CC/CV controller) controls the battery charge current and ensures that the battery is not overcharged (i.e. the charging process is properly terminated when the battery is fully charged).

Typically the battery voltage changes significantly during the charging process, as the battery is charged from a fully (or partially) discharged state to a fully charged state. The battery voltage of a typical cobalt cathode LiIon battery for example can change from a minimum fully discharged voltage between typically 2.5V to 3V to a fully charged voltage (also called float voltage) of typically 4.1 or 4.2 V (depending on the anode material). As the Vsupply output voltage of the DC/DC converter is typically a substantially constant regulated voltage in the some prior art solutions and the battery voltage (Vbat) changes significantly during the charge process the dissipation on the pass device of the linear charger (which is connected between Vsupply and Vbat in FIG. 1.a) also changes significantly during the charging process.

For example if Vin=5V, Vsupply=4.4V, the battery charge current is set at Icharge=1A and the battery is a single cell LiIon battery with a fully discharged (minimum) voltage of 2.7V and a float voltage of 4.2V the dissipation of the pass device of the linear charger changes from a 1.7 W maximum to approximately zero (when the battery is fully charged and the change current is substantially zero). However, a relatively high dissipation (like 1.7 W in this example) may be difficult to accommodate in a portable consumer device (like a smart phone), which has a small physical size, without the device getting excessively hot.

One of the prior art solutions to reduce the above mentioned power dissipation problem of the linear charger, in a cascade DC/DC converter-linear charger arrangement, is making Vsupply variable instead of substantially constant. The prior art circuit disclosed in U.S. Pat. No. 7,710,079 for example regulates the DC/DC converter's output voltage (Vsupply) to track the battery voltage (Vbat) with a given offset voltage. In this prior art circuit, Vsupply can be regulated to be, for example, 200 mV higher than the battery voltage, for a certain range of battery voltages. This offset provides an approximately constant overhead voltage (input-output voltage difference, Voverhead), which is necessary for the proper operation of the linear charger. This substantially constant overhead solution would limit the dissipation of the linear charger of the above example to Pdiss=Voverhead*Icharge=200 mW during the battery charging process, representing an approximately 8× reduction in maximum dissipation compared to the previous prior art example.

A cascade combination of a DC/DC converter with one or more linear voltage regulators, whereby the output voltage of the DC/DC converter is controlled to reduce the overhead (hence the dissipation) of the linear regulators was disclosed in prior art U.S. Pat. No. 7,486,058.

LIST OF FIGURES

The present invention is illustrated by way of example, and not by way of limitation, in the figures of the accompanying drawings:

FIG. 1.a shows a prior art cascade combination of a DC/DC converter and a linear battery charger.

FIG. 1.b is a block diagram of a composite battery charger including a switching regulator-linear charger combination according to the present invention.

FIG. 4b shows an exemplary relationship between the voltage on the non-inverting input of the voltage error amplifier of the switching regulator and the current sense voltage of the embodiment shown in FIG. 4a.

FIG. 8 is a graph showing the supply voltage, battery voltage and battery charge current as functions of time in an embodiment of the present invention during the battery charging process.

DETAILED DESCRIPTION OF THE INVENTION

Figure 2:
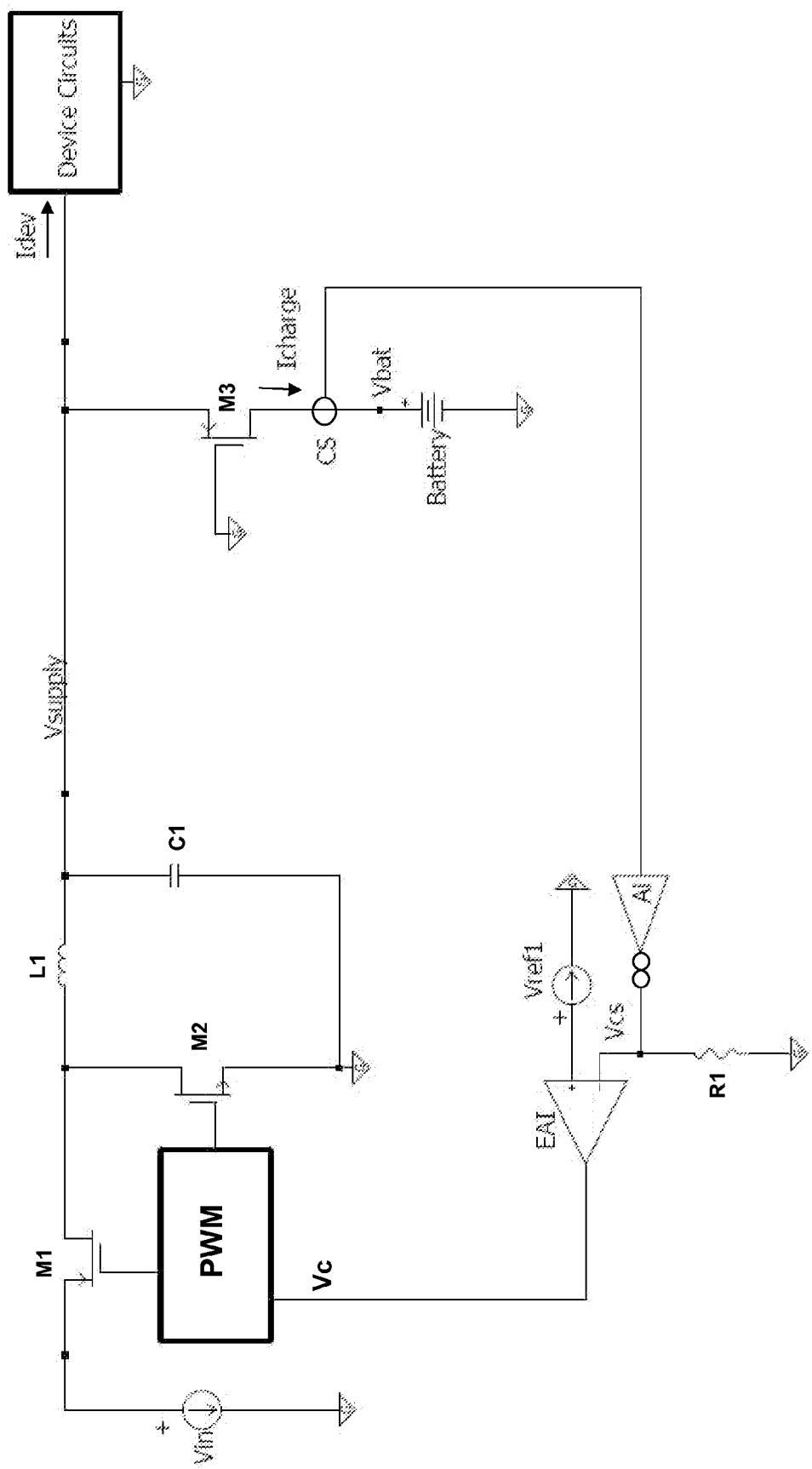
FIG. 2 shows an embodiment of the CC control section of a composite battery charger including a switching regulator-linear charger combination employing the control method of the present invention.

The present invention discloses methods and circuits to control a composite battery charger including a switching regulator, typically operating from a power limited input source (whereby the power limit of the input source may be implemented as a current limit), and a linear charger, where the switching regulator's output voltage provides the supply voltage for the linear charger and also the supply voltage for certain Device Circuits. The switching regulator may be implemented as a DC/DC converter. The circuits and methods of the present invention may achieve lower linear charger dissipation than prior art methods (e.g. prior art methods and circuits providing constant overhead voltage for the linear charger). While the present invention is primarily aimed at charging LiIon or other Lithium based batteries, and the example embodiments utilize this type of battery, it should be understood to be applicable to other types of batteries, e.g. NiCad, NiMH, Lead Acid, etc., with appropriate modifications corresponding to the specifics of the battery chemistry, as a person with ordinary skill in the art (POSITA hereinafter) would understand.

A high level block diagram of the composite battery charger including a switching regulator-linear charger combination of an embodiment of the present invention is shown in FIG. 1.b. The Switching Regulator block provides on its output the voltage Vsupply, which supplies both the Device Circuits and the linear charger. The Linear Charger supplies the Icharge battery charging current to the battery. A battery current sensing circuit provides an Icharge Sense feedback signal, which is representative of the sensed battery charge current, to the control circuitry of the Switching Regulator. In one embodiment, the battery current sensing circuit is incorporated into the Linear Charger. Optionally a battery voltage sense signal (Vbat Sense) is also provided to the control circuitry of the Switching Regulator (indicated with dotted feedback line).

The arrangement provides CC/CV charging for the battery while also providing a supply voltage for the Device Circuits. The supply voltage for the Device Circuits may change with the battery voltage, as the battery is being charged. In constant current (CC) operating mode, the pass device of the Linear Charger may be fully turned on. Accordingly, if the pass device is a MOSFET transistor, it may behave substantially like a resistor (corresponding to the on-resistance, Rdson, of the MOSFET transistor). The on-resistance value of the MOSFET transistor depends on the size of the MOSFET, its threshold voltage, and the gate source voltage (the value of which may depend on the supply voltage of the circuit), among other parameters. The battery charging current, Icharge, through the pass device of the Linear Charger is sensed and coupled to the control circuit of the Switching Regulator via Icharge Sense signal, a signal representative of Icharge. The control circuit (controller) of the Switching Regulator compares the Icharge Sense signal with a current reference signal. The amplified difference between the Icharge Sense signal and a current reference signal is utilized to control the output voltage of the Switching Regulator, Vsupply. The current limit of the Switching Regulator (if it exists) is set to a higher current than the maximum value of the current needed by the Device Circuits (Idev) plus the maximum battery charge current, which corresponds to the current reference signal described above.

The present invention relates to battery charging methods and circuits typically used in portable consumer devices (devices hereinafter), like cellular phones, smart phones, music players, tablet computers, etc. The subject matter is described with reference to the drawings, wherein like reference numerals, device names, and node and/or signal identifiers are used to refer to like elements throughout. In the following description, for purposes of explanation, numerous specific details are set forth in order to provide a thorough understanding of the subject innovation. It should be evident, however, that the subject matter may be practiced without these specific details. In other instances, well-known structures and devices are shown in block diagram form in order to facilitate describing the subject innovation.

Moreover, the word "exemplary" is used herein to mean serving as an example, instance, or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Furthermore, "predetermined value," "target value," and "regulated value" are not limited to a fixed value but meant to include values that are programmed via digital, analog or other means. The programming may occur during the manufacturing process of the apparatus or of any of the components used to implement the apparatus (e.g. trimming at wafer sort or final test, etc.), and/or can be implemented by the user during calibration or during normal operation based on certain operating conditions.

FIG. 2 shows an embodiment of the CC control section of the composite battery charger including a switching regulator-linear charger combination employing the control method described above in the context of FIG. 1.b. Power switch MOSFETs M1 and M2, together with inductor L1 and capacitor C1 form the power stage of a standard synchronous buck converter, which is one type of switching regulator that may be used in one embodiment. In one embodiment, M1 is a p-channel MOSFET (PFET, illustrated with its source arrow pointing inward) and M2 is an n-channel MOSFET (NFET, illustrated with its source arrow pointing outward). Any appropriate controlled switching device (e.g. bipolar transistors, etc.) could alternatively be used as power switches in the switching regulator circuit of FIG. 2. It is also understood that although FIG. 2 shows a synchronous buck converter to provide a switching regulator function, other converter topologies (e.g. boost, buck-boost, flyback, etc.) including non-synchronous converters may be used.

The buck converter controller includes a pulse-width modulator (PWM), which controls the turn on and turn off of transistors M1 and M2. The controller also includes EAI error amplifier, which controls the duty cycle of the main switching transistor M1 by its Vc output signal, which is an input into the PWM block. The circuitry inside the PWM block may be implemented based on any of the known PWM control methods (e.g. voltage-mode, current-mode, etc.)

The pass device of the linear charger, M3, shown as a p-channel MOS (PMOS) transistor, may be fully turned on in constant current (CC) mode in the exemplary embodiment of FIG. 2 by connecting its gate to GND (or moving it close to ground potential). In one embodiment, any appropriate controlled active device (e.g. bipolar transistor, etc.) can be used as pass device in the linear charger circuit of FIG. 2. The current through M3, the battery charge current (Icharge), is sensed by current sensor CS, may be scaled by current amplifier Ai, and may be turned by termination resistor R1 into a proportional current sense voltage, Vcs, which is a signal representative of the sensed battery charge current and corresponds to the Icharge Sense signal in FIG. 1b. This charge current sense voltage, Vcs, is compared with a reference voltage, Vref1, by EAI error amplifier, which amplifies the difference and provides the Vc control voltage for the PWM Controller.

EAI error amplifier may include frequency compensation components (typically consisting of resistors and capacitors) as is known in the art. When this negative feedback control loop is in balance, the error amplifier, EAI, and the pulse width modulator, PWM, maintain the Vsupply output voltage of the buck converter (i.e. the Switching Regulator) at a value that provides a battery charge current corresponding to Vref1. Vsupply is substantially independent of the current consumed by the Device Circuits, Idev, and typically only weakly dependent on the battery charge current Icharge.

Note that this CC control method and circuit does not monitor or sense the output voltage of the buck converter, Vsupply. Rather, Vsupply is a dependent variable, its value depending on the charge current (corresponding to Vref1) and the Rdson(M3), the on-resistance of the M3 MOSFET pass device, as well as the battery voltage which may vary during the battery charging process. The overhead voltage, Voverhead, of the linear charger is Voverhead=Icharge*Rdson (M3), where Rdson(M3), the on-resistance of the M3 MOSFET pass device of the linear charger, depends on semiconductor process parameters, M3's size and feature size (W, L), its threshold voltage, its junction temperature, Vbat, etc. Given a set of MOSFET parameters and circuit voltages the overhead voltage provided by the embodiment shown in FIG. 2 is substantially the minimum achievable, yielding substantially the lowest dissipation of the linear charger in CC operating mode.

While the embodiment of FIG. 2 shows a buck converter as the switching regulator, it is understood that the buck converter shown could be replaced with an AC/DC converter or other types of switching regulators. The current sense circuit (shown in FIG. 2 as including current sensor (CS), current amplifier (Ai), and termination resistor (R1)) can be implemented by any of the numerous current sense circuits known in the prior art or by any appropriate current sense circuit. Furthermore, the controller circuit of the switching regulator (buck converter in the embodiment shown in FIG. 2) may be implemented by analog or digital elements. In case of a digital implementation, EAI error amplifier function may be implemented by either digital hardware or software/firmware running on a microprocessor, digital signal processor (DSP), or other programmable device. In case of a digital implementation, the output signal of the digitally implemented EAI function (Vc) may be a digital signal. Similarly, the input signals of EAI may be digital signals which may be generated using known analog to digital converter circuits.

Figure 3:
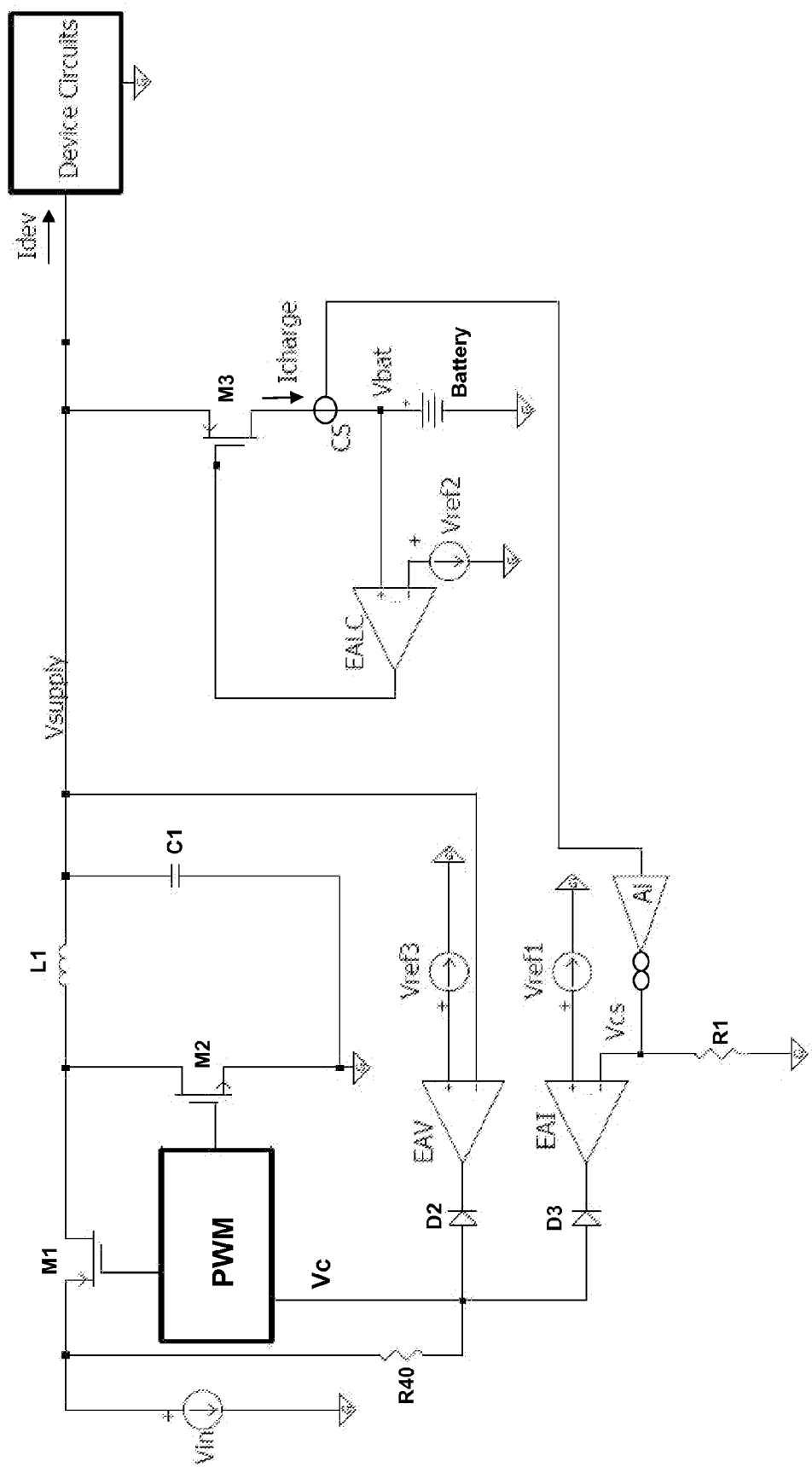
FIG. 3 shows an embodiment implementing both a constant current (CC) and a constant voltage (CV) functionality of the battery charger.

FIG. 3 shows an embodiment implementing both constant current (CC) and constant voltage (CV) functionality of the composite battery charger. In CC operating mode, when the battery voltage, Vbat, is lower than the float voltage set by reference voltage Vref2, the linear charger's voltage error amplifier (EALC) turns the M3 pass device fully on by pulling its gate down to substantially ground potential (or close to it). The voltage error amplifier (EAV) of the buck converter compares the buck converter's output voltage, Vsupply, with a reference voltage Vref3. Vref3 is set to a voltage that is higher than the float voltage of the battery (which is set by Vref2) by an appropriate margin. In one embodiment, the margin between Vref2 and Vref3 is set to be greater than the voltage drop on the M3 pass device at full charge current (corresponding to Vref1).

Hence, in CC operating mode Vsupply is lower than Vref3 and the output of EAV is at its highest value, close to its supply voltage, reverse biasing D2 diode. The reverse biased D2 diode decouples the output of EAV from Vc.

Diode D3, forward biased by resistor R40, couples the output of the current error amplifier EAI to the Vc control input of the pulse-width modulator (PWM). As long as the battery voltage is not close to the float voltage value, set by Vref2, the circuit of FIG. 3 operates in CC mode. This is similar to the operation described in connection with FIG. 2. In CC operating mode the buck converter is controlled by the Vc control voltage through the EAI error amplifier to maintain a constant battery charge current (corresponding to Vref1) which in steady state operation is substantially independent of the value of the Device Circuits current (Idev). The output voltage of the buck converter, Vsupply, tracks the battery voltage Vbat with an offset voltage corresponding to Voverhead.

When the battery voltage gets close to the float voltage (i.e. end of charge voltage), set by Vref2, the linear charger's error amplifier, EALC, gets into its active region and starts increasing the gate voltage of M3, modulating its conductivity, i.e. increasing its Rdson. This operation is part of the transition between the CC and CV operating regions of the battery charger, initiated by EALC error amplifier acting as a CV controller for the battery charger. When this happens, EAI raises its output voltage, which raises the Vc voltage, to increase the Vsupply voltage (to attempt to maintain the battery charge current at a value corresponding to Vref1 in the face of the increasing Rdson of M3 and corresponding increasing Voverhead). Vsupply voltage increases until it gets close to Vref3, at which point error amplifier EAV becomes active (its output voltage decreasing). As Vsupply increases error amplifier EAV takes over the control of Vc via the forward biased D2 diode. EAV limits the maximum value of Vsupply to approximately Vref3. The switching regulator controller includes the pulse-width modulator (PWM) and error amplifiers EAI and EAV.

As the battery voltage gets closer to the float voltage, set by Vref2, error amplifier EALC reduces the battery charge current by reducing the current of M3 (by increasing its gate voltage). Eventually the battery voltage Vbat reaches its float voltage value set by Vref2, and EALC turns off pass device M3, reducing the battery charge current to substantially zero, in effect terminating the charging process and transitioning the battery charger into a CV operating mode. The charge termination circuit may in one embodiment include circuitry (not shown) that turns off M3 when the charge current drops below a predetermined low threshold current value. In one embodiment, charge termination circuit may prevent turning M3 back on until the battery voltage Vbat has dropped by a certain value (due to being discharged). At the termination of battery charging, the value of the Vsupply voltage is substantially constant corresponding to Vref3, supplying only the Idev current.

In the circuit of FIG. 3, the dissipation of the pass device M3 in CC mode is $PdCC=(Ichgmax^2)*Rdson(M3)$, where Ichgmax is the maximum charge current corresponding to Vref1. In CV mode the dissipation is approximately zero, as the charge current is substantially zero. In the transition region between CC and CV mode the theoretical maximum dissipation is approximately bounded by $Pdtrmax=(Vref3-Vref2)*Ichgmax$, occurring for a very short period of time during the charging process. This dissipation in the transition region can be limited by choosing the value of Vref3 judiciously. As an example, if the circuit of FIG. 3 is used to charge a single cell LiIon battery with a float voltage of 4.2V, with a maximum charge current of 1A, using an M3 with a typical Rdson of 0.1 Ohm, Vref3 may be 4.4V. This would result in a maximum dissipation of less than 0.2 W in the transition region, and a typical dissipation of 0.1 W in the CC region.

If Vref3 is set significantly above Vref2 then the dissipation of M3 may be excessive in the transition region between CC and CV operating modes. This can be mitigated, in one embodiment, by modulating Vref3, as a function of the measured Icharge current. In one embodiment, the modulated Vref3 starts from a lower value Vref3L and may gradually increase as Icharge declines (due to the action of EALC) to its final designed value, Vref3. For example, Vref3L may be set at 4.4V, at maximum charge current, corresponding to approximately Vref1, and Vref3 may be 5V in this numeric example. This way, a low dissipation of M3 can be ensured throughout the transition region, independent of the value of Vref3.

Figure 4A:
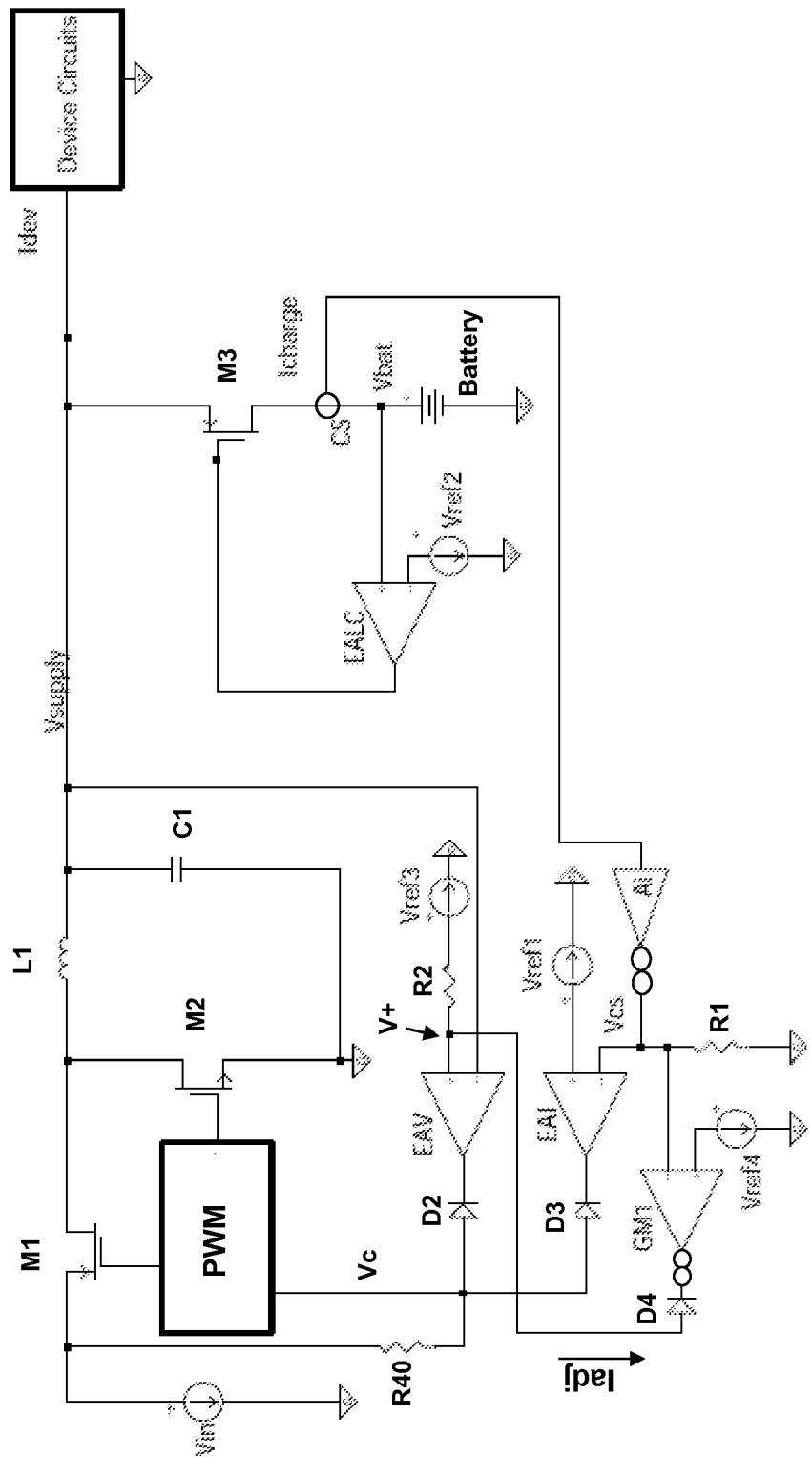
FIG. 4a shows another embodiment of the composite battery charger including a switching regulator-linear charger combination.

FIG. 4a shows an exemplary charger circuit, including circuitry to implement this modulation (reduction) of the reference voltage on the non-inverting input of the EAV error amplifier as a function of the measured Icharge battery charge current. GM1 transconductance amplifier may have a substantially constant gain (gm, transconductance) of gm1. Its output sink current, Iadj, may be a substantially linear function of the difference between the charge current sense voltage Vcs and a reference voltage Vref4:

$Iadj=gm1*(Vcs-Vref4)$.

The output sink current Iadj is coupled to the non-inverting input of the EAV error amplifier via diode D4. The non-inverting input of the EAV error amplifier is also coupled to the reference Vref 3 through resistor R2. At full (i.e. maximum) battery charge current (set by Vref1) the voltage of the non-inverting input of EAV error amplifier, V+, is approximately $V+=Vref3L=Vref3-R2*gm1*(Vcsmax-Vref4)$. With proper choice of component values (e.g. R2, gm1, etc.) Vref3L can be set to a target value above Vref2 but close enough to limit the dissipation to the desired relatively low value (e.g. to 4.4V in the numerical example above). As the battery charge current is decreased by the EALC error amplifier (and the current sense voltage Vcs decreases accordingly) the output current of GM1 (Iadj) decreases and V+ increases. If the current sense voltage, Vcs, drops below a value set by Vref4 the GM1 amplifier will try to generate a source current instead of the sink current which is blocked by diode D4. Hence for current sense voltages below Vref4 there will be substantially no current flowing through resistor R2 and the voltage on the non-inverting input of the EAV error amplifier, V+, equals Vref3, corresponding to the circuit shown in FIG. 3. The switching regulator controller for the embodiment shown in FIG. 4.a includes the pulse-width modulator (PWM), error amplifiers EAI and EAV and transconductance amplifier GM1.

Figure 4B:
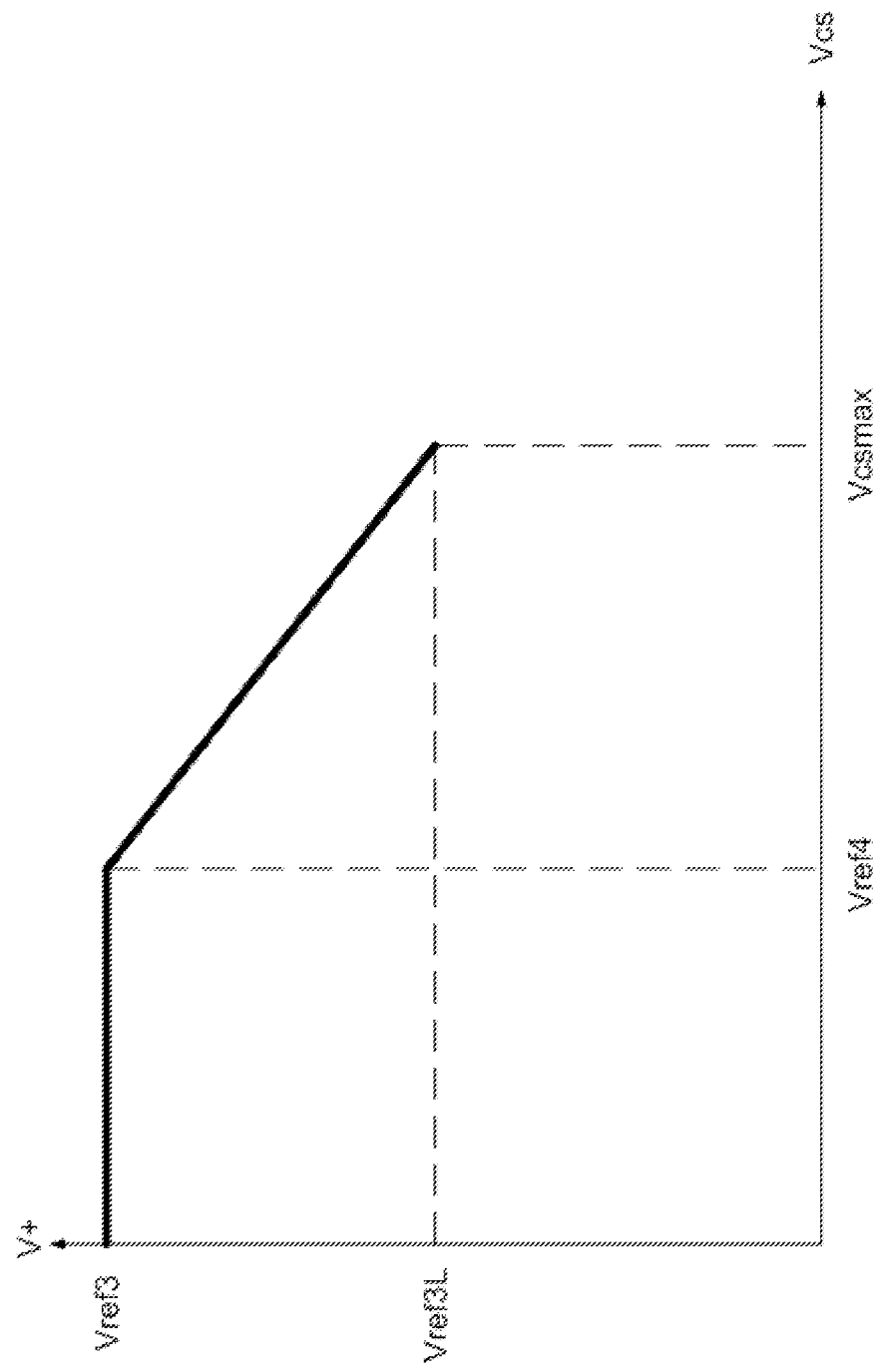

The exemplary relationship between V+ and Vcs (corresponding to Icharge) in the circuit shown in FIG. 4a is shown in FIG. 4b (diagram is not to scale). When the charger operates in CC mode Vcs is at its maximum value, Vcsmax (approximately equaling Vref1 in the embodiment of FIG. 4a). This results in a voltage, V+=Vref3L on the non-inverting input of EAV error amplifier. As the battery charger starts to reduce the charge current (because the battery voltage gets close to the float voltage set by Vref2) the V+ voltage increases. The increase in this particular example is substantially linear, and it continues until Vcs reaches Vref4, at which point V+ reaches its maximum value Vref3. The dissipation on M3 pass device may be higher at some point along the transition between CC and CV modes than at the beginning of the transition. However, proper choices of the design parameters should yield a design that has acceptably low maximum power dissipation over the full charging process.

It should be understood that while the disclosed embodiment shows a linear transition of the V+voltage between its minimum and maximum values, other transition functions may be implemented. Furthermore, numerous alternative circuit implementations may exist providing functionality and benefits that are the same as, or similar to, the functionality and benefits of the exemplary circuit of FIG. 4a. For example, the value of the V+ voltage may be modulated during the CC to CV transition to maintain a substantially constant maximum die temperature of pass device M3. As the die temperature has a substantially linear relationship with the dissipation, maintaining a substantially constant maximum die temperature corresponds to a limited maximum dissipation on the pass device.

In one embodiment, the error amplifiers in FIG. 3 and FIG. 4a may include frequency compensation elements to maintain stability under all operating conditions. The design of such frequency compensation elements is known in the art. Furthermore, error amplifiers may be implemented as transconductance amplifiers, and EAV and EAI may be implemented as "merged" error amplifiers. Using such merged transconductance amplifiers eliminates the need for D2 and D3 diodes but maintains the functionality shown in the embodiment of FIG. 3. Furthermore, in one embodiment, some or all of the amplifiers in FIG. 3 and FIG. 4.a may be implemented digitally (instead of the shown analog implementation) by either digital hardware or software/firmware running on a microprocessor, digital signal processor (DSP), or other programmable device. In case of a digital implementation, the output signal of the digitally implemented amplifier functions (e.g. Vc) may be a digital signal. Similarly, the input signals of the digitally implemented amplifiers may be digital signals which may be generated using known analog to digital converter circuits.

Although in the embodiment of FIG. 3 Vsupply and Vbat are directly monitored by the error amplifiers EAV and EALC respectively, alternatively they can be monitored through resistor dividers, as it is known in the art. In the embodiments of FIG. 3 and FIG. 4a if the input source (Vin) is disconnected the battery charging is stopped. In this case, pass device M3 may be turned on (by circuitry not shown) so that the Battery can supply Vsupply (and Idev) powering the Device Circuits.

One circuit implementation example for the charge current sense circuit that may be used in the circuits of FIG. 2, FIG. 3, or FIG. 4a is shown in FIG. 4.c. The circuit is well known, and its operation is not described here in detail. With the shown area ratio between M3 and M30 (n:1) the current sense voltage, $$Vcs \text{ is: } Vcs=(Icharge/n)*R1.$$

Other current sense circuits providing similar functionality can also be used. The output voltage of a typical analog current sense circuitry may be digitized by known analog-to-digital conversion techniques in case of a digital implementation of the EAI error amplifier function.

In case a current/power limited input power source provides Vin, it may be possible that the maximum charge current (corresponding to Vref1) and the maximum Device Circuits current (Idev) would result in a switching regulator input current exceeding the maximum current the input power source can provide. In one embodiment, the battery charge current may be reduced in order to maintain the proper operation of the Device Circuits without exceeding the maximum current the input source can provide. This can be accomplished by monitoring the current, Iin, consumed from the input power source (Vin) by the switching regulator. An embodiment of an input current monitoring circuit is shown in FIG. 5a.

The reduction of the charge current, Icharge, is accomplished by reducing the reference voltage, V40, on the non-inverting input of the charge current controlling error amplifier EAI in the circuit of FIG. 3 (or in the circuits of FIG. 2 or FIG. 4a or another implementation of a similar circuit). The voltage reduction is facilitated by placing a resistor, R50, between Vref1 and V40. CSIN current sense circuit senses the Iin current from the input source. Aiin current sense amplifier with resistor R30 converts the sensed input current to a proportional Vcsin input current sense voltage. Error amplifier EAINP compares Vcsin with a reference voltage Vref20, which may be set to a voltage corresponding to an input current slightly lower than the current limit of the input source. If the input current reaches the level corresponding to Vref20 the output of error amplifier EAINP decreases, which in turn decreases reference voltage V40 on the non-inverting input of the EAI error amplifier via diode D20 and resistor R20. Decreasing V40 yields decreasing Vcs sense voltage and corresponding decrease in the battery charge current.

Figure 5B:
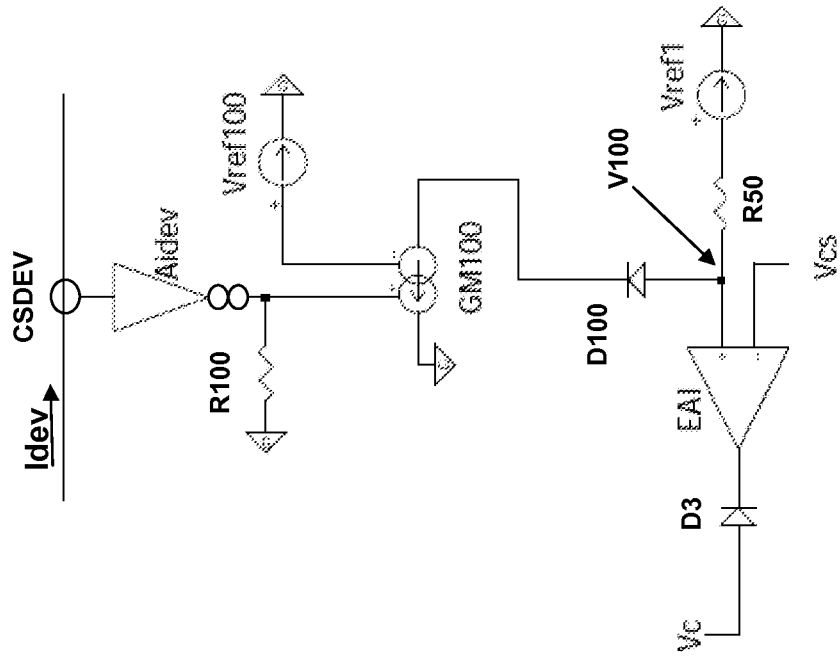
FIG. 5b shows an exemplary circuit to implement input current limiting utilizing device current sensing in circuits of the present invention.
Figure 5A:
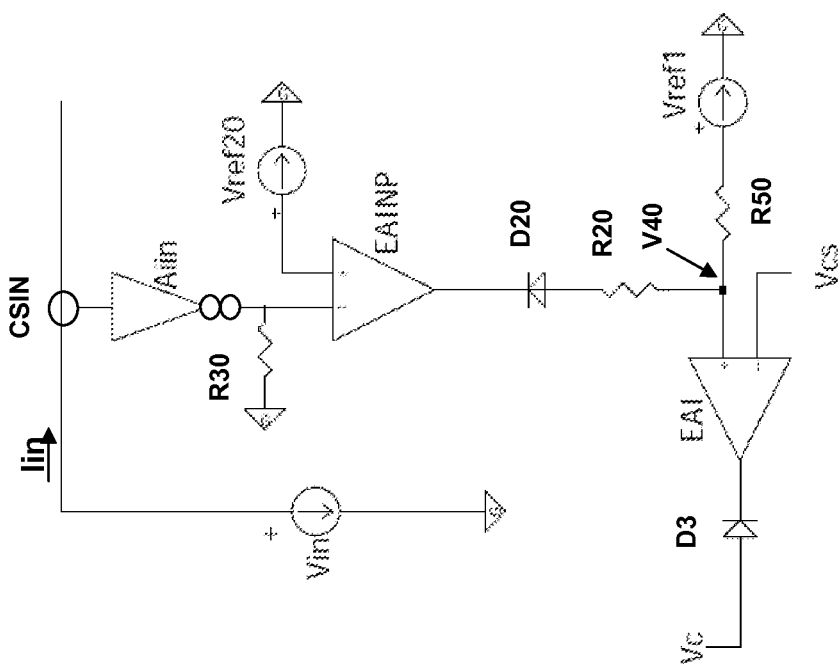
FIG. 5a shows an exemplary circuit to implement input current sensing/limiting in circuits of the present invention.

An alternative to the battery charge current modulation circuit shown in FIG. 5a is a circuit that increases the sense voltage Vcs (by injecting current into its node) if Iin reaches the level corresponding to Vref20. In some embodiments, EAINP may contain frequency compensation elements to ensure stability, and may be implemented by a transconductance amplifier. Furthermore, the functionality EAINP and the subtraction function creating V40 may be implemented digitally when EAI is implemented digitally.

An alternative embodiment of a circuit to ensure that the sum of the maximum battery charge current and the device current (Idev) does not result in a switching regulator input current that exceeds the maximum available current from the power/current limited input power source is shown in FIG. 5b. The designer, knowing the maximum current, Iinmax of the power/current limited power source and the maximum battery charge current that is set by Vref1, may calculate the maximum current that is available for the device, Idevthr, if the battery is charged with its maximum charge current. The circuit of FIG. 5b shows a circuit that reduces the battery charge current if the device current exceeds the Idevthr threshold value so that the sum of the Idev and Icharge current does not result in the input current of the DC/DC converter Iin exceeding the current limit of the source.

In FIG. 5b, GM100 transconductance amplifier (modeled in FIG. 5b with a voltage controlled current source) senses the difference of a current sense voltage that is proportional to the Device Current Idev (via CSDEV, Aidev and R100) and Vref100 reference voltage, which corresponds to Idevthr and generates an output sink current which is proportional to this difference. If the device current exceeds Idevthr GM100 reduces the V100 reference voltage on the non-inverting input of charge current controlling error amplifier EAI via D100 (by dropping a voltage on resistor R50) thereby reducing the maximum battery charge current. With appropriate choice of component values the circuit reduces the maximum battery charge current approximately the by same amount as the device current, Idev, exceeds the Idevthr threshold (set by Vref100), ensuring that Idev+Icharge<=Idevthr+Icharge-max. While the circuits of FIGS. 5a and 5b were described in the context of the battery charger circuit in FIG. 3 it is understood that in can be applied in the context of battery charger circuits with other configurations, including the ones shown in FIG. 2, FIG. 4a and FIG. 6. Furthermore, the functionality of GM100 and the subtraction function creating V100 may be implemented digitally when EAI is implemented digitally.

The circuits and methods described and disclosed above work properly with batteries that operate correctly, or with batteries failing as an open circuit (or under conditions where the battery is removed from the equipment or disconnected from the linear charger). However, if the battery fails in a way that represents a short circuit (or close to a short circuit) between its terminals, the circuits and methods disclosed above would not enable the buck converter (switching regulator) to properly supply the Device Circuits. Similarly, if the battery is over-discharged and the battery voltage falls below its minimum voltage it may result in a low Vsupply voltage value during battery charging that is too low, i.e. inadequate for the proper operation of the Device Circuits.

LiIon batteries are typically built in battery packs, including the battery cells and a number of protection functions/circuits. A typical LiIon battery pack cannot fail as a short circuit unless the protection circuitry inside the battery pack malfunctions. A properly functioning battery protection circuit prevents the discharge of the battery below its minimum voltage. A typical LiIon in-pack protection circuit disconnects the battery cells inside the battery pack from the battery pack terminals if the battery voltage drops to a predefined minimum level, which may be 2.5V per cell. If this protection circuit is operational, then even if the battery cell inside the battery pack fails as a short circuit, the battery pack at its terminals (which are the only battery terminals accessible to a user) looks like an open circuit. Hence, it is very rare that a LiIon battery, or any battery with in-pack protection circuitry, fails as a short circuit or is over-discharged below its minimum battery voltage threshold. However, the battery charger circuits and methods described above in the present invention can be modified to operate correctly (i.e. power the Device Circuits correctly) even if the battery pack fails in a way that presents a short circuit at the battery pack terminals.

In some applications the Device Circuits require a minimum supply voltage that is higher than the minimum (fully discharged) battery voltage. For example, the minimum battery voltage (for a fully discharged battery) may be 2.7V in a system employing a single cell Lilon battery, but the Device Circuits may require at least 3.3V supply voltage to operate correctly. The embodiment of the charging circuit shown in FIG. 6 adds the capability of supporting a predefined minimum value of the supply voltage, Vsupply, as well as the capability of providing the appropriate supply voltage for the Device Circuits even with shorted or over-discharged battery.

Figure 6:
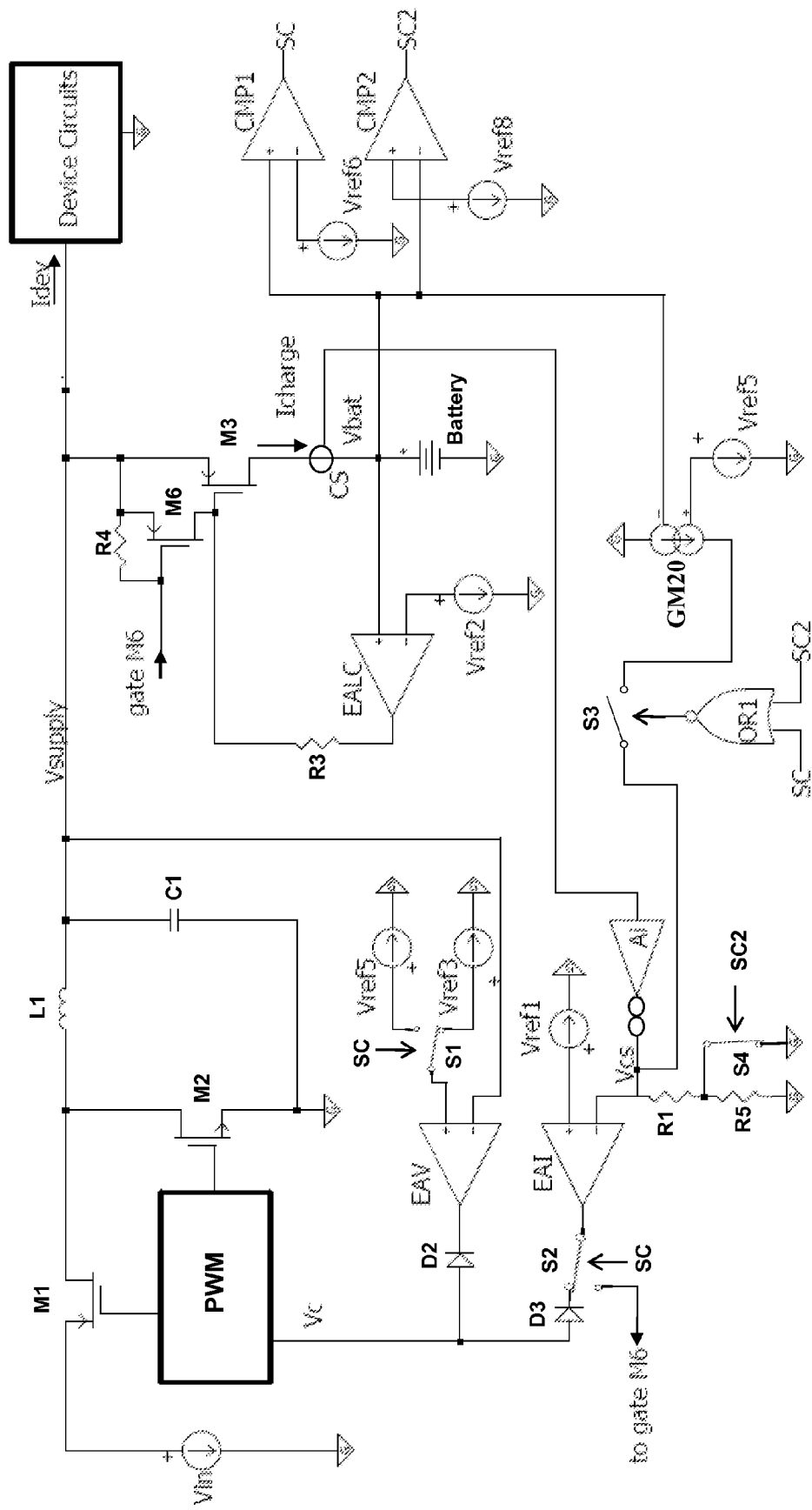
FIG. 6 shows yet another embodiment of the present invention.

FIG. 6 shows a circuit adapted to provide a minimum supply voltage, Vsupplymin, that is higher than the minimum (fully discharged) battery voltage, and is capable of operating correctly with shorted battery terminals. Comparator CMP1 monitors the battery voltage Vbat by comparing it to a reference voltage Vref6. If the battery voltage Vbat is higher than Vref6, the battery charger circuit operates the same way as described in connection with the circuit of FIG. 3 (component and signal names shared by FIG. 3 and FIG. 6 designate identical elements, in one embodiment). Reference voltage Vref6 is preferably above the minimum battery voltage of the system, where the minimum battery voltage for the system may be for example between 2.7V and 2.9V in a typical system using a single cell Lilon battery.

The output signal, SC, of CMP1 comparator, is logic high in one embodiment if Vbat is higher than Vref6, and this logic high signal controls S1 and S2 switches. Switch S3 is controlled by a logical NOR of SC of CMP1 and SC2 of CMP2. FIG. 6 illustrates these 3 switches in the position they have when Vbat is higher than Vref6. In these switch positions, the output of EAI current error amplifier is connected to the cathode of diode D3 (via S2), MOSFET M6 is kept off by resistor R4, the non-inverting input of voltage error amplifier EAV is connected to reference Vref3 (via S1), while the output of transconductance amplifier, GM20, is floating (not connected to Vcs/R1).

Comparator CMP2 also monitors the battery voltage and compares it to reference Vref8, which corresponds to the minimum (fully discharged) battery voltage. The battery voltage should not drop below this threshold unless the battery pack (or a battery monitoring circuitry) is defective. As long as the battery voltage is above Vref8, the output of comparator CMP2 is logic low, keeping S4 switch closed (as shown in FIG. 6), ensuring that the load resistor of Ai current sense amplifier is R1 (as in FIG. 3).

If the battery voltage Vbat is below the Vref6 reference voltage the output signal SC of comparator CMP1 goes to logic low, changing the positions of switches S1 and S2, to the opposite of the state shown in FIG. 6. When SC goes logic low switch S3 is switched (closed if Vbat is above Vref8, to the opposite of its shown position in FIG. 6).

S1 connects reference voltage Vref5 to the non-inverting input of EAV. Verf5 is a lower voltage than Vref3 (which sets the value of Vsupply when the battery is fully charged or if it fails in a way that presents an open circuit). Reference voltage Vref5 sets the minimum value of the supply voltage Vsupply provided to the Device Circuits if the battery voltage is below Vref6. The value of Vref6 is preferably chosen to be high enough that Vre6+Voverhead substantially equals, or is slightly larger than, the minimum operating supply voltage of the Device Circuits. The value of Vref5 is preferably chosen to be slightly higher than Vref6+Voverhead and hence slightly higher than the minimum operating supply voltage required by the Device Circuits.

The output of the EAI current error amplifier is decoupled from D3 by switch S2 and coupled to the gate of MOSFET transistor M6. EAI, together with M6 and EALC, forms a CC/CV control circuit for the linear charger. As Vref6 and Vref5 are chosen lower than the float voltage of the battery (set by Vref2), the linear charger's pass device (M3) is controlled by the current error amplifier EAI, via MOSFET M6, when the CMP1 output signal SC is logic low. Under these conditions, the M3 pass device is functioning as a current source charging the battery, operating from a supply voltage, Vsupply, that is regulated to be approximately equal to Vref5 by error amplifier EAV. However, as the minimum battery voltage can be significantly lower than Vsupplymin (set by Vref5) the dissipation of M3 pass device can be higher than desirable when the full (maximum) charge current (corresponding to Vref1, CS, Ai and R1) is applied to the battery through M3.

To avoid excessive dissipation, in one embodiment transconductance amplifier, GM20, is connected to the current loop to reduce the charge current. The output of the GM20 transconductance amplifier, which is connected to Vcs (i.e. resistor R1) via switch S3, increases the current flowing into R1 resistor, reducing the charge current, Icharge. The reduction of charge current in the embodiment of FIG. 6 is an approximately linear function of the difference between Vref5 and the battery voltage (Vbat), which substantially corresponds to the drain-source voltage of the M3 pass device. The lower the battery voltage (i.e. the larger the difference between Vref5 and Vbat) the higher the current injected into Vcs by the GM20 amplifier, and the lower the battery charging current maintained by EA1 through M3.

The battery charging current, Icharge, is controlled by the current control loop (which includes EA1, M6, Vref1, current sense circuitry CS-Ai-R1, and transconductance amplifier GM20). By choosing the transconductance (gm20) of transconductance amplifier GM20 appropriately, the dissipation of the M3 pass device can be kept at an acceptably low level for battery voltages between approximately Vref8 and Vref6. The transconductance amplifier GM20, in one embodiment, sources current into the Vcs node, increasing the voltage drop on resistor R1. In one embodiment, a diode can be added between the output of GM20 and Vcs to block sink current.

As a numeric example, consider the following single Lilon cell battery and circuit specifications:
minimum (fully discharged) battery voltage of 2.7V
fully charged float voltage of 4.2V,
maximum charge current set at 1A (via Vref1)
dissipation on M3 at the minimum battery voltage limited to approximately 200 mW
minimum operating supply voltage of the Device Circuits is 3V
minimum value of Vsupply set to approximately 3.3V (via Vref5).

With these numbers, the reference voltages may be set as follows:
Vref3 is set at 4.4V,
Vref2 is set at 4.2V,
Vref5 is set to 3.3V,
Vref6 is set to 3.05V.

Assuming that the gain of CS and Ai together is $1/1000$, this results in a current of 1 mA provided to R1 by Ai at 1A charge current. Choosing Vref1 to be 2V yields a value of 2 kOhm for R1.

To maintain the target maximum 200 mW dissipation at the minimum battery voltage of 2.7V the GM20 transconductance amplifier brings down the charge current to Ichg=Pd/Vds=0.2 W/(3.3V-2.7V)=0.33A. This requires a 0.66 mA output current from the GM20 amplifier, corresponding to a gm20 transconductance value of 0.66 mA/0.6V=1.1 mS. The targeted 200 mW dissipation at the minimum battery voltage is not the highest dissipation across the battery voltage range, from the minimum 2.7V and the maximum (for this operating range) 3.2V. The dissipation as a function of battery voltage is a parabolic function, with its maximum at about 3.15V in this numerical example. The maximum dissipation for this numeric example is about 225 mW, which is higher than the targeted 200 mW at the minimum battery voltage by is still reasonably low for a typical handheld consumer device. A similar charge current modulating functionality can be achieved by modulating the value of the voltage on the non-inverting input of the EAI error amplifier, along the lines shown in FIGS. 5.a and 5.b. Furthermore, the embodiment shown in FIG. 6 can be combined with the embodiment shown in FIG. 4a, limiting the power dissipation of the pass transistor of the linear charger both while the battery is being charged between Vbatmin and approximately Vsupplymin (via GM20 in FIG. 6) and during the linear charge's CC/CV transition while Vsupply rises from slightly above Vbatmax to Vsupplymax (via GM1 in FIG. 4a).

In the embodiment in FIG. 6 the EAI current error amplifier is used for both the DC/DC converter's current loop and the linear charger's current loop (switched by switch S2). In another embodiment, the same functionality can be achieved using two separate current error amplifiers.

For most battery types, especially for LiIon batteries which are powering the vast majority of handheld consumer devices today, the recommended charge current for batteries that are malfunctioning (e.g. shorted), or over-discharged below the minimum recommended battery voltage, is a trickle charge current. The value of the trickle charge current may be typically 5% of the full maximum charge current. In the above numerical example, this would correspond to a trickle charge current of 50 mA.

Returning to FIG. 6, a faulty (e.g. shorted) or over-discharged battery is detected by comparator CMP2. CMP2's output voltage goes to logic high when the battery voltage is below the minimum battery voltage, set by Vref8 (2.7V in the above numerical example). The logic high value of SC2 opens switch S3 via NOR gate OR1 (disconnecting the GM20 amplifier from Vcs) and opens switch S4 increasing the resistor loading current sense amplifier Ai from R1 to R1+R5. In the above numerical example, where R1=2 kOhm, R1+R5 should be approximately 40 kOhm to set 50 mA charge current with Vref1=2V. For these numbers, in one embodiment, R5 should be set at 38 kOhm. In case of a shorted battery, the maximum dissipation on the M3 pass transistor in this numerical example is Pd=50 mA*3.3V=165 mW. This dissipation is lower than the targeted 200 mW at the minimum (fully discharged) battery voltage, and as such is acceptably low.

Comparators CMP1 and CMP2 may have a small hysteresis to avoid chattering. The reference voltages in the embodiment of FIG. 6 (and other embodiments) may be either fixed voltages or may be voltages that are programmable (digitally or other known means) to a desired target voltage value. Furthermore, the SC signal may be generated other ways than shown in the embodiment of FIG. 6, including monitoring when the charge current drops below the value corresponding to Vref1 while the battery voltage is close to the value of Vref5.

Figure 7:
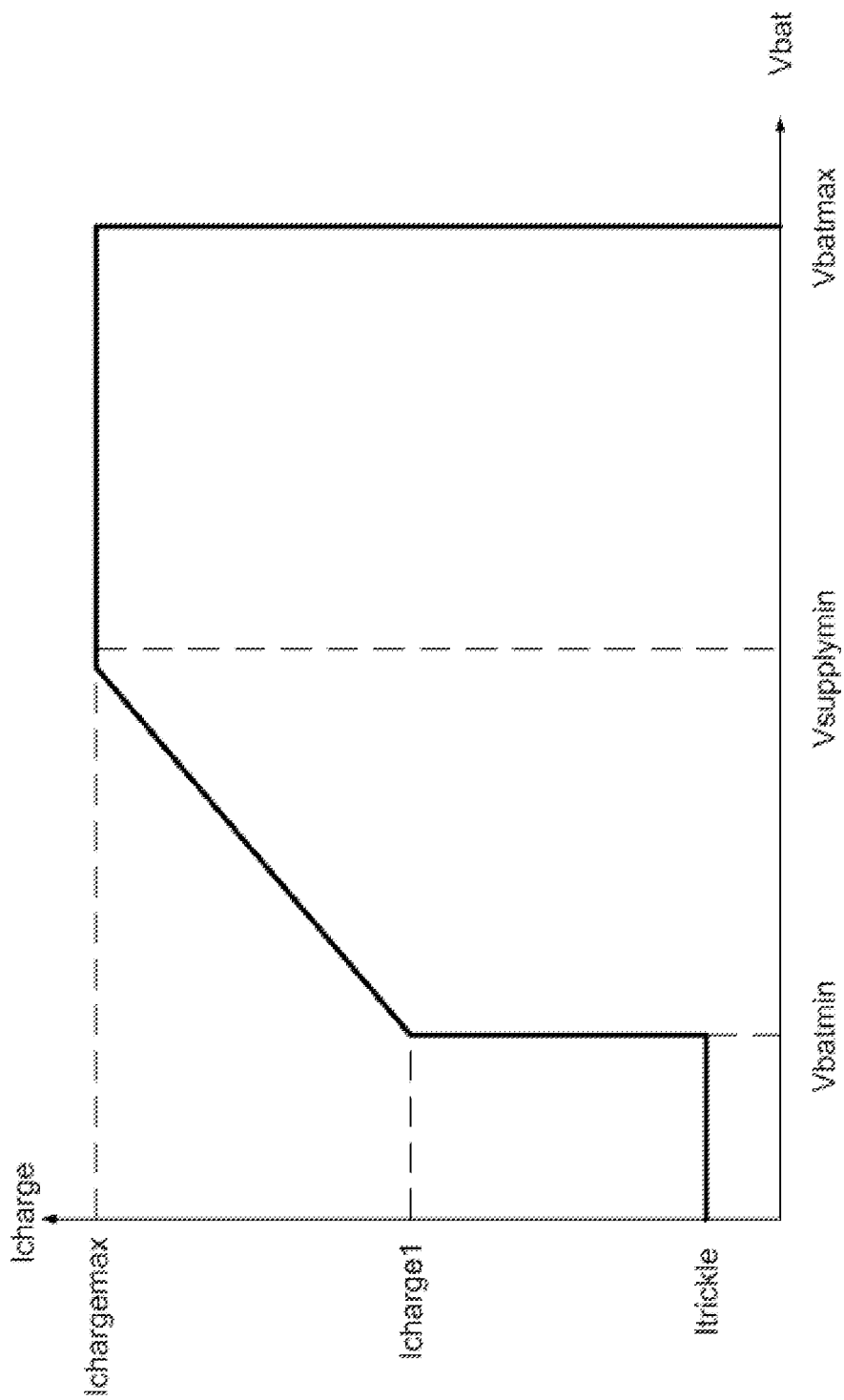
FIG. 7 is a graph showing a typical dependence of the battery charge current on the battery voltage in an embodiment of the present invention.

FIG. 7 illustrates the battery charging current as a function of battery voltage of the circuit shown in FIG. 6. The charge current from Vbat=0 to Vbatmin (the fully discharged battery voltage) is the trickle charge current (50 mA in the above numerical example). In some applications charging is disabled if Vbat<Vbatmin. In some applications, charging is disabled if the temperature of the battery is above a predetermined maximum temperature threshold. Between Vbatmin and slightly below Vsupplymin, the charge current increases from Icharge1 to Ichargemax linearly, where Icharge1 is set to limit the dissipation of the pass device M3 via transconductance amplifier GM20, as described above. In the above numerical example Icharge1=0.33A while Ichargemax is 1A.

The battery is charged with the full Ichargemax charge current (corresponding to Vref1 in FIG. 6) until the battery voltage approaches the float voltage (Vbatmax, 4.2V in the above numerical example). At that time, the voltage control error amplifier of the linear charger, EALC, terminates the charging by reducing the charge current to zero when the battery voltage reaches substantially the float voltage. In one embodiment, an end-of-charge circuit (not shown) is added to the embodiment of FIG. 6, which drops the battery charge current to zero when it has been reduced below a certain predefined threshold (e.g. 0.05*Ichargemax). The end-of-charge circuit may also be configured to prevent the re-initiation of the battery charging process until the battery voltage drops below a predetermined threshold. The re-initiation threshold can be 0.95*Vbatmax, in one embodiment. This feature may extend battery life for certain battery types, e.g. for LiIon batteries. It should be understood that the described end-of-charge circuit/function can be added to any of the embodiments described above.

FIG. 8 illustrates an exemplary battery charge current, Icharge, the battery voltage, Vbat, and the output voltage of the DC/DC converter, Vsupply, over a full battery charge cycle in the embodiment shown in FIG. 6 in combination with the embodiment shown in FIG. 4a. The curves are not to scale. The battery voltage in this example is zero when the battery charging starts (as mentioned above, some embodiments prevent battery charging under these circumstances). Correspondingly, the battery is charged with trickle current Itrickle until Vbat reaches Vbatmin at time point t1.

At time t1, the battery charge current is increased to Icharge1 and increases linearly between t1 and t2, under the control of GM20 and EAI (as described above with respect to FIG. 6), reaching Ichargemax at time point t2. Between time points t1 and t3 Vsupply is maintained at approximately Vsupplymin (corresponding to Vref5 in FIG. 6), and the battery voltage, Vbat, increases, typically non-linearly, between t1 and t2 due to the linearly increasing battery charge current and substantially linearly between t2 and t3 corresponding to Ichargemax charge current.

As the battery voltage reaches a value corresponding to Vref6 at time point t3, the circuit switches the reference of voltage error amplifier EAV from Vref5 to the higher Vref3 and the current error amplifier EAI from controlling the gate voltage of the pass transistor M3 to controlling the DC/DC converter via control voltage Vc. At the t3 switch-over point there may be a small drop in the value of Vsupply (depending on the relationship between Vref6, Vref5, and the voltage drop on M3) which is not shown in FIG. 8. As the battery voltage increases between time points t3 and t4 due to the battery charge current (Ichargemax), the output voltage of the DC/DC converter Vsupply also increases with it with an offset of approximately Rdson(M3)*Ichargemax.

As the battery voltage reaches approximately Vbatmax, at time t4, the voltage error amplifier of the linear charger EALC gets into its active region reducing the charge current through the pass transistor M3 below Ichargemax. As a consequence, the output voltage of the DC/DC converter Vsupply rises to Vsupplymax (corresponding to Vref3). The rise can be rather quick, independent of the battery charge current in the embodiment of FIG. 6, or it can be gradual based on the gradually decreasing battery charge current, corresponding to the embodiment of FIG. 4a, limiting the dissipation of M3 during the CC/CV transition.

FIG. 8 shows gradual transition corresponding to FIG. 4a, with Vsupply reaching Vsupplymax at approximately time point t5. Starting at time t4 the voltage error amplifier EALC gradually reduces the battery charge current to zero, unless an end-of-charge circuit (not shown) stops the charging at time point t6 by cutting the charge current to zero when its value dropped below a certain threshold, such as 5% of Ichargemax for example.

There are several circuit variations that would provide the same or similar functionality as the circuit shown in FIG. 6, that could embody the present invention. For example, the modulation of Vref3, discussed in connection with the embodiment in FIG. 4a can also be applied in the circuit shown in FIG. 6. Furthermore, the analog minimum tracking function realized by diodes D2 and D3 could be implemented other ways, e.g. with merged transconductance error amplifiers. Similarly, the output signals of EAI and EALC could be combined other ways, known in the art, achieving the same CC/CV control of the linear charger (potentially eliminating M6, R4 and R3).

Figure 4C:
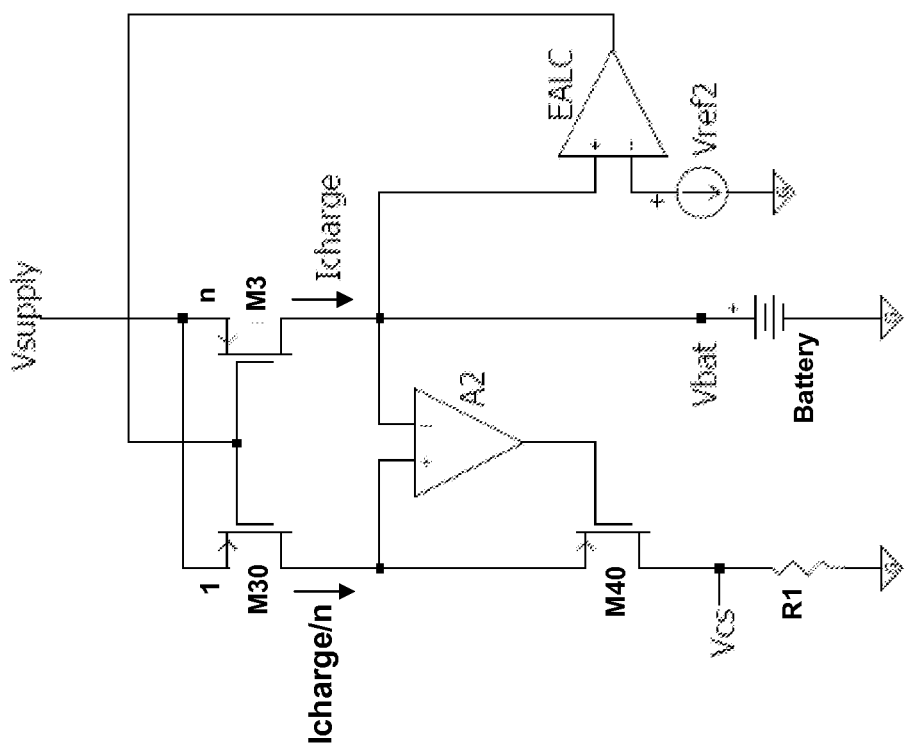
FIG. 4c shows an exemplary circuit for sensing the current of the pass transistor of the linear charger.

Furthermore, in one embodiment, the current sense circuit (comprising CS, Ai and R1) can be implemented by circuitry other than shown in FIG. 4c, and Vref1 can be a current reference instead of a voltage reference, in case EAI operates on current inputs. In one embodiment, transconductance amplifier GM20 can be replaced be a voltage difference amplifier, which modulates Vcs or Vref1 achieving the targeted reduction of charge current in the linear charger as a function of the battery voltage. While the embodiment in FIG. 6, and the current-voltage characteristics illustrated in FIG. 7, show a substantially linear relationship between Vbat and Icharge when the battery voltage is between Vref8 and Vref6 the relationship does not have to be linear. In one embodiment, pulse charging can be applied in the CC to CV transition region of the battery charger to reduce the dissipation of the pass device of the linear charger in this transition region. However, this may result in an AC voltage component superimposed on the voltage Vsupply, which may not be acceptable for certain Device Circuits.

Furthermore, while the exemplary embodiments the control circuits/functionality were shown as implemented by analog circuits (amplifiers, comparators, etc.), it is understood that the same functionality can be achieved using a digital implementation, or a mixed analog-digital implementation. The digital elements may be implemented by either digital hardware or software/firmware running on a microprocessor, digital signal processor (DSP), or another programmable device. In case of a digital implementation, the output signal of the digitally implemented amplifiers (e.g. Vc) may be a digital signal. Similarly the inputs of the digitally implemented amplifier and comparators may be generated by well know analog-to-digital converter functionality converting the sensed voltages (or currents) and the reference voltages (or currents) into corresponding digital values.

In the above specification, the invention has been described with reference to specific exemplary embodiments. It will, however, be evident that various modifications and changes may be made without departing from the scope of the invention as set forth in the appended claims. The specification and drawings should be regarded in an illustrative rather than a restrictive sense.

What is claimed is:

1. A method to control a composite battery charger charging a battery having a battery voltage, comprised of a combination of a switching regulator and a linear battery charger, the switching regulator including a power switch which is turned on and off with a duty cycle by a pulse width modulator (PWM) and the switching regulator having an output voltage providing supply voltage for the linear battery charger and for one or more device circuits consuming a device current, the method comprising:
   turning a pass transistor of the linear charger substantially fully on in a constant current (CC) operating mode;
   generating a control signal based on a difference of a signal representative of a sensed battery charge current provided through the pass transistor and a first reference value based on a target battery charge current; and
   the pulse width modulator controlling the duty cycle of the power switch of the switching regulator based on the control signal to maintain a battery charge current substantially constant approximately corresponding to the first reference value, substantially independently of the device current and the battery voltage until the battery voltage approaches a maximum fully charged battery voltage level.

2. The method of claim 1 whereby the switching regulator is a DC/DC converter.

3. A method to control a composite battery charger charging a battery having a battery voltage, comprised of a combination of a switching regulator and a linear battery charger, the switching regulator including a power switch which is turned on and off by a switching regulator controller and the switching regulator having an output voltage providing supply voltage for the linear battery charger and for one or more device circuits consuming a device current, the method comprising:
   turning a pass transistor of the linear charger substantially fully on in a constant current (CC) operating mode;
   generating a control signal based on a difference of a signal representative of a sensed battery charge current provided through the pass transistor and a first reference value based on a target battery charge current,
   the switching regulator controller controlling the power switch of the switching regulator based on the control signal to maintain a battery charge current substantially constant approximately corresponding to the first reference value, substantially independently of the device current and the battery voltage until the battery voltage approaches a maximum fully charged battery voltage level;
   reducing the battery charge current by a first CV controller monitoring the battery voltage and coupled to the pass transistor, by controlling a conductivity of the pass transistor when the battery voltage approaches the maximum fully charged battery voltage level; and
   reducing the battery charge current to substantially zero when the battery voltage is substantially at the maximum fully charged battery voltage level.

4. The method of claim 3 further comprising:
   increasing the output voltage of the switching regulator to a maximum output voltage value as the battery charge current is reduced by the first CV controller;
   comparing a signal representative of the output voltage with a second reference value representative of the maximum output voltage; and
   generating an output signal based on the comparison, the output signal coupled to the control signal.

5. The method of claim 4 further comprising:
reducing the value of the maximum output voltage value by utilizing a second controller, by a first function of a difference between the signal representative of the sensed battery charge current and a third reference value, to reduce dissipation of the pass transistor of the linear charger when the battery charger is not operating in a CC operating mode.

6. The method of claim 5 wherein the first function is a substantially linear function.

7. The method of claim 4 further comprising:
providing input power to the switching regulator from a current limited source;
monitoring a current provided by the source; and
reducing the battery charge current value to prevent the combination of the battery charge current and the device current from resulting in an operating condition of the composite battery charger exceeding the power or current limit of the source.

8. The method of claim 4 further comprising:
providing input power to the switching regulator from a current limited source;
determining a device current threshold value based on the current limit of the source and the predetermined target battery charge current value;
monitoring the device current and comparing it to a device current threshold value and generating a second output signal based on the comparison; and
reducing the maximum battery charge current value based on the second output signal by approximately a difference between the device current and the device current threshold value to prevent the combination of the battery charge current and the device current from resulting in an operating condition of the composite battery charger exceeding a current limit of the current limited source.

9. The method of claim 4 further comprising:
maintaining the output voltage of the switching regulator between the maximum output voltage value and a minimum output voltage value;
monitoring the battery voltage and generating a comparison signal value in CC operating mode when the battery voltage is below a first threshold voltage; and
based on a comparison signal value maintaining the output voltage of the switching regulator at substantially the minimum output voltage value.

10. The method of claim 9 further comprising:
reducing the battery charge current based on the difference of the minimum output voltage value and the battery voltage to reduce a power dissipation of the pass transistor.

11. The method of claim 9 further comprising:
reducing the predetermined target battery charge current value to a trickle charge current level when the battery voltage is below a predetermined second threshold voltage.

12. A method to control a composite battery charger charging a battery having a battery voltage, comprised of a switching regulator and a linear battery charger, the linear battery charger providing a battery charge current through a pass transistor, and the switching regulator including a power switch being turned on and off with a duty cycle by a pulse-width modulator (PWM), the switching regulator having an output voltage providing supply voltage for the linear battery charger and for one or more device circuits consuming a device current, the method comprising:
maintaining the output voltage between a minimum and a maximum value;
terminating battery charging when the battery voltage substantially reaches a predetermined maximum battery voltage value and the battery charge current drops below a predetermined battery current threshold value;
sensing a signal representative of the battery charge current, comparing the signal to a reference value and generating a control signal based on the comparison;
providing a target battery charge current to the battery when the output voltage is approximately at or above the minimum value and the battery voltage is below the maximum battery voltage value by substantially fully turning on the pass transistor and controlling the pass transistor current by the switching regulator based on the control signal; and
limiting a power dissipation of the pass transistor below a predetermined level by one or more of: limiting a voltage drop on the pass transistor as a function of the battery charge current, or limiting the target battery charge current as a function of the voltage drop on the pass transistor.

13. A composite battery charger to charge a battery having a battery voltage, comprising:
one or more device circuits;
a switching regulator including:
a power switch turned on and off with a duty cycle;
an output voltage providing supply voltage for a linear battery charger and for one or more device circuits consuming a device current;
a pass transistor of the linear charger turned substantially fully on in a constant current (CC) operating mode;
a current error amplifier setting a control voltage based on a difference of a sensed battery charge current and a first reference value based on a target battery charge current;
a pulse width modulator (PWM) controlling the duty cycle of the power switch based on the control voltage to maintain a battery charge current substantially constant approximately corresponding to the first reference value, substantially independently of the device current and the battery voltage until the battery voltage approaches a maximum fully charged battery voltage level;
reducing the battery charge current by a first CV controller monitoring the battery voltage and coupled to the pass transistor, by controlling a conductivity of the pass transistor when the battery voltage approaches a maximum fully charged battery voltage level; and
reducing the battery charge current to substantially zero when the battery voltage is substantially at the maximum fully charged battery voltage level.

14. A composite battery charger to charge a battery having a battery voltage, comprising:
a switching regulator including:
a power switch turned on and off with a duty cycle set by a first controller;
the switching regulator having an output voltage providing supply voltage for a linear charger and for one or more device circuits consuming a device current;
the linear charger including:
a pass transistor;
a linear charger controller to turn the pass transistor substantially fully on in a constant current (CC) operating mode and to reduce the pass transistor's conductivity when operating outside the CC operating mode;
the first controller further to generate a control signal based on a difference of a sensed value representative of a battery charge current and a first reference value based on a target battery charge current, and to control the duty cycle of the power switch based on the control signal, to maintain the battery charge current substantially constant approximately corresponding to the first reference value, substantially independently of the battery voltage and the device current.

* * * * *